(12) United States Patent
Yashiro et al.

(10) Patent No.: US 8,384,983 B2
(45) Date of Patent: Feb. 26, 2013

(54) ELECTROCHROMIC DISPLAY DEVICE, FABRICATION METHOD THEREFOR, AND DRIVING METHOD THEREFOR

(75) Inventors: Tohru Yashiro, Kanagawa (JP); Shigenobu Hirano, Kanagawa (JP); Yoshihisa Naijo, Kanagawa (JP); Koh Fujimura, Tokyo (JP); Masahiro Yanagisawa, Kanagawa (JP); Masahiro Masuzawa, Kanagawa (JP); Hitoshi Arita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/195,161

(22) Filed: Aug. 1, 2011

(65) Prior Publication Data
US 2012/0033286 A1    Feb. 9, 2012

(30) Foreign Application Priority Data

Aug. 3, 2010  (JP) ................................. 2010-174192
Jun. 21, 2011 (JP) ................................. 2011-137121

(51) Int. Cl.
  *G02F 1/153*  (2006.01)
  *G02F 1/15*   (2006.01)
(52) U.S. Cl. ........................ 359/269; 359/265
(58) Field of Classification Search .......... 359/265–275; 345/105
See application file for complete search history.

(56) References Cited

U.S. PATENT DOCUMENTS

| | | | |
|---|---|---|---|
| 4,908,283 A | 3/1990 | Takahashi et al. | |
| 7,352,500 B2 * | 4/2008 | Jagt et al. | 359/265 |
| 7,639,415 B2 | 12/2009 | Jung et al. | |
| 7,894,118 B2 | 2/2011 | Hirano et al. | |
| 2006/0066933 A1 | 3/2006 | Jagt et al. | |
| 2009/0231664 A1 | 9/2009 | Shibuya et al. | |

FOREIGN PATENT DOCUMENTS

| | | |
|---|---|---|
| JP | 63-94501 | 4/1988 |
| JP | 2001-510590 | 7/2001 |
| JP | 2003-270671 | 9/2003 |
| JP | 2008-304906 | 12/2008 |
| JP | 2010-33016 | 2/2010 |
| WO | WO 98/35267 | 8/1998 |
| WO | WO 2004/017134 A1 | 2/2004 |

OTHER PUBLICATIONS

Nov. 16, 2011 European search report in connection with counterpart European patent application No. 11 17 6266.

* cited by examiner

*Primary Examiner* — Tuyen Tra
(74) *Attorney, Agent, or Firm* — Cooper & Dunham LLP

(57) ABSTRACT

An electrochromic display device includes a display substrate, a counter substrate facing the display substrate, counter electrodes formed on the counter substrate, at least first and second display electrodes arranged between the display substrate and the counter electrodes, the first display electrode and the second display electrode having a predetermined distance from each other, a first electrochromic layer arranged on the first display electrode and a second electrochromic layer arranged on the second display electrode, an electrolyte layer arranged between the respective first and the second display electrodes and the counter electrodes, and a protective layer made of an insulator material formed on a counter electrode facing side surface of one of the first and the second display electrodes such that the protective layer is sandwiched between the selected one of the first and the second display electrodes and a corresponding one of the first and the second electrochromic layers.

8 Claims, 6 Drawing Sheets

US 8,384,983 B2

ELECTROCHROMIC DISPLAY DEVICE, FABRICATION METHOD THEREFOR, AND DRIVING METHOD THEREFOR

BACKGROUND OF THE INVENTION

1. Field of the Invention

The disclosures herein relate to an electrochromic display device, a method for manufacturing the electrochromic display device, and a method for driving the electrochromic display device, and more specifically related to an electrochromic display device capable of independently displaying multicolor, a method for manufacturing such an electrochromic display device, and a method for driving such an electrochromic display device.

2. Description of the Related Art

Electronic paper has been increasingly developed as electronic media replacing ordinary paper. The feature of the electronic paper may be that its display device is handled as ordinary paper, which differs largely from related art display devices such as cathode ray tubes or liquid crystal display devices. For example, the electronic paper may be a highly reflective display device capable of exhibiting high white state reflectance and high contrast ratio, high definition, stable memory effects, low-voltage driven, thin and light-weight, and inexpensive characteristics.

Various types of display devices have been proposed suitable for the electronic paper. Examples include a reflective liquid crystal display device, an electrophoretic display device, and a toner electrophoretic display device. These types of display devices may be provided with layers of different color filters so as to display device multiple color. However, the color filters themselves may absorb light to lower the reflectance of the display device. Thus, the above types of display devices may have difficulty in producing multicolor images while maintaining certain white state reflectance and contrast ratio.

Meanwhile, as an example of a reflective display device without having color filters, an electrochromic display device may be given. The electrochromic display device utilizes electrochromism. The electrochromism is a phenomenon in display devices of materials that exhibit reversible color changes induced by the application of voltages. When a voltage is applied to the electrochromic display device, electrochromic materials undego reversible redox reactions to reversibly change color. The electrochromic display device is a reflective display device, has memory effects, and capable of being driven by a low voltage. Accordingly, the electrochromic display device has been extensively studied as one of the prospective candidates for the electronic paper display devices, from material development to device design.

Note that the technology of the electrochromic display device is based on the principles of redox reactions to develop or dissipate colors of materials. Accordingly, electrochromic responsiveness may be relatively low. For example, Japanese Patent Application Publication No. 2001-510590 (Patent Document 1) discloses an example of an electrochromic system utilizing the above principles of redox reactions. In this electrochromic system, electrochromic compounds are fixed near electrodes such that the system has a very rapid electrochromic effect. In the system disclosed in Patent Document 1, electrochromic response time was significantly improved from about ten seconds typically obtained in the related art electrochromic display devices to one second.

Further, since the electrochromism is an electrochemical phenomenon, electrochromic responsiveness or memory effects of color in the electrochromic display device may be largely affected by the performance of the electrolyte layer (e.g., ionic conductance) forming the electrochromic display device. The electrochromic display device including the liquid electrolyte layer formed by dissolving electrolytes into solvents may exhibit excellent electrochromic responsiveness; however, the electrochromic display device may exhibit inferior element strength or reliability.

However, a solid-state electrolyte layer or a gel-like electrolyte layer has been proposed to overcome such inferiorities. Specifically, the solid-state electrolyte layer formed of polymeric solid-state electrolyte has been proposed. The electrical conductivity of the polymeric solid-state electrolyte may be approximately 3 digits lower than an ordinary non-aqueous electrolytic solution. To overcome such low conductivity of the polymeric solid-state electrolyte, Japanese Patent Application Publication No. 63-94501 (Patent Document 2), for example, proposes a semisolid electrolyte layer obtained by dissolving polymers into an organic electrolytic solution, or an electrolyte layer having cross-linked polymers obtained by allowing electrolyte-containing liquid polymers to undergo polymerization reaction.

However, in the electrochromic display device formed of pixel electrodes arranged in a matrix and configured to display or dissipate desired pixels, electric charges are likely to diffuse outside of the selected pixel regions within the electrolyte layer. In particular, if the electrolyte layer is a liquid electrolyte layer, electric charges are more likely to diffuse outside of the selected pixel regions. To overcome such charge diffusion in the electrolyte layer, Japanese Patent Application Publication No. 2008-304906 (Patent Document 3) proposes a display device capable of selectively displaying desired pixels alone. In this display device, the electrolyte layer is formed corresponding to the selected pixels to be displayed to prevent the electric charges from diffusing outside of the selected pixel regions.

The electrochromic display devices may develop various colors based on various structures of electrochromic compounds, and hence, they are expected to be utilized as multicolor display device devices. An example of the multicolor display device utilizing the electrochromic display device is disclosed in Japanese Patent Application Publication No. 2003-270671 (Patent Document 4). The disclosed multicolor display device includes two or more layers of electrochromic elements each having a structural unit formed by arranging an electrochromic layer and an electrolyte layer between a pair of transparent electrodes.

In addition, Japanese Patent Application Publication No. 2010-33016 (Patent Document 5) discloses another example of the multicolor display device utilizing the electrochromic display. The disclosed multicolor display device is formed by two or more electrochromic layers between a pair of a display substrate and a counter electrode. In the disclosed multicolor display device, two or more display electrodes are provided mutually separate from each other between the pair of the display substrate and the counter electrode so that the electrochromic layer is formed corresponding to each of the display electrodes.

However, the multicolor display devices utilizing the electrochromic display devices disclosed in the related art seem to have room for improvement in the following aspects.

For example, in the multicolor electrochromic display device disclosed in Patent Document 4, since the multicolor electrochromic display device is formed of the layers of two or more electrochromic elements, there may be an increase in manufacturing cost compared to that of the monochrome electrochromic display device formed of one layer of the electrochromic element. Further, since the monochrome electrochromic display device formed of one layer of the electrochromic element needs to have two layers of transparent electrodes, the multicolor electrochromic display formed of two or more layers of the electrochromic elements may need to have twice as many as the number of layers of the electrochromic elements, which may lower the reflectance and the contrast.

Meanwhile, in the multicolor electrochromic display device disclosed in Patent Document 5, the electrochromic layers of the display electrodes are selectively driven to develop or dissipate a corresponding color of the electrochromic layer of the selected display electrode. Accordingly, the electric resistance between the display electrodes arranged separately from each other may need to be higher than the electric resistance within each of the display electrode surfaces. That is, if the electric resistance between the display electrodes is small, current may flow into unselected display electrodes. That is, it may not be possible to drive the selected display electrodes to independently develop or dissipate colors of the electrochromic layers of the selected display electrodes.

However, in the electrochromic display device disclosed in Patent Document 5, it may be difficult to sufficiently obtain insulating properties between the display electrodes in driving the selected electrochromic layers corresponding to the counter electrodes to independently develop or dissipate the corresponding colors of the selected electrochromic layers (active matrix). That is, the preceding developed color of the selected electrochromic layer may have an adverse effect on the succeeding developing color operation for developing the selected color of the electrochromic layer to be developed.

SUMMARY OF THE INVENTION

It is a general object of at least one embodiment of the present invention to provide an information processing apparatus and an information processing method that substantially eliminate one or more problems caused by the limitations and disadvantages of the related art.

It is a general object of at least one embodiment of the present invention to provide an electrochromic display device having a structure simpler than the electrochromic display device having two or more layers of the electrochromic elements, and capable of independently developing or dissipating desired colors. In one embodiment, there is provided an electrochromic display device that includes a display substrate; a counter substrate facing the display substrate; an array of counter electrodes formed on the counter substrate; at least a first display electrode and a second display electrode arranged between the display substrate and the array of the counter electrodes, the first display electrode and the second display electrode having a predetermined distance from each other; a first electrochromic layer arranged on the first display electrode and a second electrochromic layer arranged on the second display electrode; an electrolyte layer arranged between the first and the second display electrodes and the array of the counter electrodes; and a protective layer made of an insulator material formed on a counter electrode facing a side surface of one of the first and the second display electrodes such that the protective layer is sandwiched between the selected one of the first and the second display electrodes and a corresponding one of the first and the second electrochromic layers.

In another embodiment, there is provided a method for manufacturing the electrochromic display device. The manufacturing method includes forming the protective layer by vacuum deposition.

In another embodiment, there is provided a method for driving the electrochromic display device. The driving method includes applying voltages between the first and the second display electrodes and the corresponding counter electrodes in the order of distance from farthest to closest between the first and the second display electrodes and the corresponding counter electrodes to subsequently drive the first and the second electrochromic layers to develop corresponding colors.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.
(Electrochromic Display Device)

Figure 1:
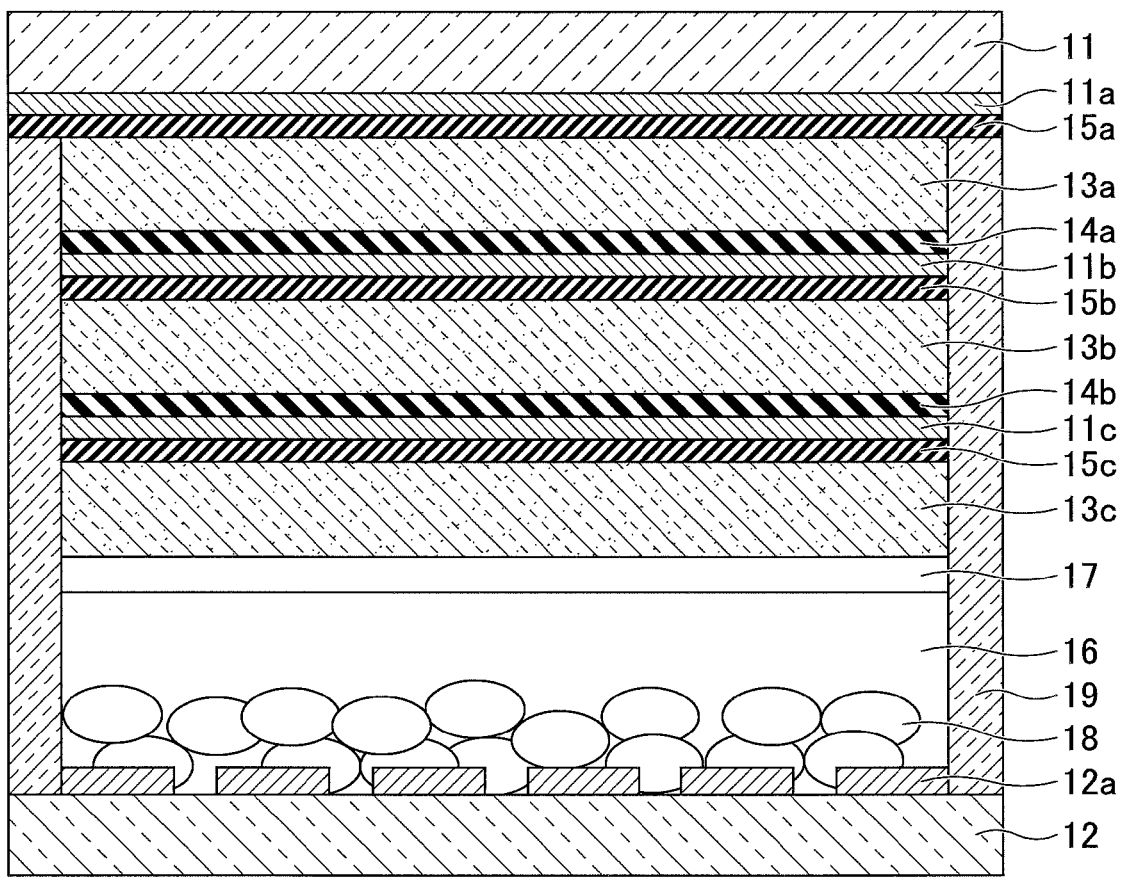
FIG. 1 is a cross-sectional diagram schematically illustrating a configuration of an electrochromic display device according to an embodiment.

Next, the electrochromic display device according to an embodiment is described with reference to FIG. 1. FIG. 1 is a cross-sectional diagram schematically illustrating a configuration of the electrochromic display device according to the embodiment.

As illustrated in FIG. 1, an electrochromic display device 10 includes a display substrate 11, display electrodes 11a, 11b and 11c, a counter substrate 12, counter electrodes 12a, electrochromic layers 13a, 13b and 13c, insulator layers 14a and 14b, protective layers 15a, 15b and 15c, an electrolyte layer 16, and a white reflective layer 17.

The display substrate 11 is utilized for supporting the above layered structure of the electrochromic display device 10.

The display electrodes 11a, 11b and 11c are provided from the display substrate 11 side to the counter electrode 12a side such that the display electrodes 11a, 11b and 11c and the counter electrodes 12a are mutually arranged at predetermined intervals. The display electrode 11a is formed on the counter electrodes 12a facing side of the display substrate 11. The display electrodes 11a, 11b and 11c are configured to control an electric potential to be applied to the counter electrodes 12a such that colors of the electrochromic layers 13a, 13b and 13c are formed (developed).

The counter substrate 12 is provided such that the counter substrate 12 faces the display substrate 11 via a predetermined interval. The counter electrodes 12a are formed on the display substrate 11 facing side of the counter substrate 12.

The electrochromic layers 13a, 13b and 13c are respectively formed on the counter electrodes 12a facing side of the display electrodes 11a, 11b and 11c. The electrochromic layers 13a, 13b and 13c develop or dissipate colors by redox reaction (oxidation-reduction reaction).

The insulator layers 14a and 14b are formed on the counter electrodes 12a facing side of the electrochromic layers 13a and 13b. The insulator layers 14a and 14b are configured to retain the insulating properties between the display electrodes 11a, 11b and 11c.

The protective layers 15a, 15b and 15c are respectively formed on the counter electrodes 12a facing side of the display electrodes 11a, 11b and 11c. More specifically, the protective layers 15a, 15b and 15c are respectively formed between the display electrodes 11a, 11b and 11c and electrochromic layers 13a, 13b and 13c.

The electrolyte layer 16 is provided such that the electrolyte layer 16 is sandwiched between the display electrode 11a and the counter electrodes 12a. The electrolyte layer 16 indicates ion mobility and generally includes electrolyte and solvents. Further, the electrolyte layer 16 may include white pigment particles 18 so that the electrolyte layer 16 is provided with a white reflex function. In this case, the white reflective layer 17 may be excluded.

The white reflective layer 17 is provided for scattering light incident from the display substrate 11 side.

The electrochromic display device 10 is configured to apply voltages between the selected display electrodes 11a to 11c and the counter electrodes 12a such that the electrochromic layers 13a, 13b and 13c respectively provided on the display electrodes 11a to 11c develop or dissipate colors by redox reaction on receiving electric charges from the display electrodes 11a to 11c. Further, in the electrochromic display device 10, the electrochromic layers 13a, 13b and 13c include white reflex functions at the counter electrodes 12a facing side of the electrochromic layers 13a, 13b and 13c. Accordingly, the electrochromic display device 10 is a reflective electrochromic device having viewability from the display substrate 11 side.

Further, the electrochromic layers 13a, 13b and 13c may be formed of respective electrochromic compounds capable of developing different colors such as yellow (Y), magenta (M), and cyan (C). Accordingly, the electrochromic display device 10 may display unicolor such as Y, M, and C, or mixed color such as red (R), green (G), blue (B), and black (K).

Next, detailed configurations and materials used for units of the electrochromic display device 10 according to the embodiment are described.

The display substrate 11 may be made of glass or plastic. Specifically, when a plastic film is used as the display substrate 11, the lightweight and flexible electrochromic display device 10 may be produced.

Materials for the display electrodes 11a to 11c may not be particularly limited. The display electrodes 11a to 11c may be formed of any materials insofar as the materials include electrical conductivity. However, it is preferable that the display electrodes 11a to 11c be formed of a transparent conductive material having excellent transparency and electric conductivity. With such configurations, the display electrodes 11a to 11c may provide excellent color viewability. Examples of the transparent conductive material include inorganic materials such as indium tin oxide (ITO), fluorine doped tin oxide (FTO), antimony tin oxide (ATO), and the like. Among these, preferable materials may be inorganic materials including at least anyone of an indium oxide (hereinafter also called "In oxide"), a tin oxide (hereinafter also called "Sn oxide") and a zinc oxide (hereinafter called "Zn oxide") formed by vacuum deposition. In oxide, Sn oxide and Zn oxide may be easily deposited by sputtering and may exhibit excellent transparency and electric conductivity. Further, particularly preferable materials for the display electrodes 11a to 11c may be InSnO, GaZnO, SnO, $In_2O_3$, and ZnO.

It is preferable that the inter-electrode resistance between any two of the display electrodes 11a to 11c be sufficiently high such that the electric potential of one of the display electrodes 11a to 11c corresponding to the counter electrodes 12a is controlled independently of the electric potential of the other display electrode corresponding to the counter electrodes 12a. Accordingly, it is preferable that the display electrodes 11a to 11c be formed such that the inter-electrode resistance between any two of the display electrodes 11a to 11c is higher than the sheet resistance of any of the display electrodes 11a to 11c. In a case where a voltage is applied to any of the display electrodes 11a to 11c under the condition that the electric potential between any two of the display electrodes 11a to 11c is lower than the sheet resistance of any of the display electrodes 11a to 11c, the approximately same voltage may be applied to the other display electrodes. As a result, the electrochromic layers 13a to 13c corresponding to display electrodes may not be independently driven to develop or dissipate colors of the electrochromic layers 13a to 13c independently. It is preferable that the inter-electrode resistance between the display electrodes 11a to 11c be more than 500 times higher than the sheet resistance of each of the display electrodes 11a to 11c.

Materials for the counter substrate 12 may not be particularly limited; however, the materials used for the display substrate 11 may be used.

Materials for the counter electrodes 12a may not be particularly limited. The counter electrodes 12a may be formed of any materials insofar as the materials include electrical conductivity. In a case where the counter substrate 12 is made of glass or a plastic film, the counter electrodes 12a may be formed of a transparent conductive film such as ITO, FTO or a zinc oxide, a metallic conductive film such as zinc or platinum, or carbon. the counter electrodes 12a made of the transparent conductive film or metallic conductive film may de formed by vacuum deposition or wet coating. On the other hand, in a case where the counter substrate 12 is made of the metallic sheet such as zinc, the counter substrate 12 may also serve as the counter electrodes 12a.

As materials for the counter electrodes 12a, the materials that induce reaction reverse of the redox reaction generated in the electrochromic layers 13a to 13c may be utilized. In this case, the electrochromic layers 13a to 13c may be stably driven to develop or dissipate their colors. That is, the materials that induce reduction reaction when the electrochromic layers 13a to 13c develop colors by oxidation reaction, and induce oxidation reaction when the electrochromic layers 13a to 13c develop colors by reduction reaction may be utilized as the counter electrodes 12a or may be utilized by being formed on the surfaces of the counter electrodes 12a. With such configurations, the electrochromic layers 13a to 13c may be reliably induce reactions to develop or dissipate their colors.

The electrochromic layers 13a, 13b and 13c may be formed of materials that change colors by redox reaction (oxidation-reduction reaction). Examples of such materials include electrochromic compounds such as polymer series, pigment series, metal complex compounds, and metallic oxides known to the art.

Specific examples of the polymer and pigment electrochromic series include low molecular organic electrochromic compounds such as azobenzene series, anthraquinone series, diarylethene series, dihydroprene series, styryl series, styryl spiropyran series, spirooxazine series, spiro thiopyran series, thioindigo series, tetrathiafulvalene series, terephthalic acid series, triphenylmethane series, triphenyl amine series, naphthopyran series, viologen series, pyrazoline series, phenazine series, phenylene diamine series, phenoxazine series, phenothiazine derivative phthalocyanine series, fluorane series, fulgide series, benzopyran series, the metallocene series compounds, or high molecular compounds such as polyaniline and polythiophene compounds.

Among these, the dipyridine series compounds represented by the following general formula (1) are particularly preferable.

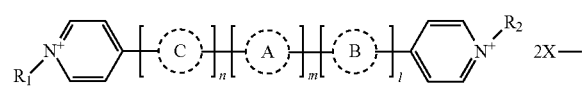

(1)

wherein $R_1$ and $R_2$ independently represent an alkyl group having 1 to 8 carbon atoms, which may have a substituent; or an aryl group having 1 to 8 carbon atoms, which may have a substituent, and at least one of $R_1$ and $R_2$ includes a substituent selected from COOH, PO(OH)$_2$, and Si(OC$_k$H$_{2k+1}$)$_3$; X represents a monovalent anion; n, m and 1 independently represent 0 or 1; k represents one of 0, 1 and 2; A, B and C independently represent an aryl group or a heterocyclic group having 2 to 20 carbon atoms, which may have a substituent. The above materials include low electric potential to develop or dissipate colors. Accordingly, these materials may exhibit a feasible color value when the electrochromic display device 10 includes plural display electrodes.

The electrochromic compounds in the electrochromic layers 13a to 13c may be adsorbed to or bonded to a semiconductor material having a nanostructure with a nano-meter order particle size (hereinafter called a "nanostructure semiconductor material"). Further, the electrochromic compounds and the nanostructure semiconductor material may be mixed to form a single layer.

Materials for the nanostructure semiconductor material may include but not be particularly limited to metallic oxides including a zinc oxide, a tin oxide, an aluminum oxide (hereinafter called "alumina"), a zirconium oxide, a cerium oxide, a silicon oxide (hereinafter called "silica"), oxidation yttrium, oxygen boron, a magnesium oxide, strontium titanate, potassium titanate, barium titanate, calcium titanate, a calcium oxide, ferrite, oxidation hafnium, a tungsten oxide, an iron oxide, copper oxide, nickel oxide, cobalt oxide, barium oxide, strontium oxide, oxidation vanadium, alumino silicic acids, or calcium phosphates as a major component. The above metallic oxides may be used alone or in combination of two or more. In view of physical properties such as an optical property or electric characteristics such as electric conductivity, in a case where one of or a combination of two or more selected from a titanium oxide, a zinc oxide, a tin oxide, alumina, a zirconium oxide, an iron oxide, a magnesium oxide, oxidation indium, and a tungsten oxide is used as the nanostructure semiconductor material, the electrochromic layers may exhibit multicolor with excellent color developing or dissipating responsiveness.

Further, the shape of the nanostructure semiconductor material may not be particularly specified but may preferably include a large surface area per unit volume (hereinafter called a "specific surface area") for efficiently carrying the electrochromic compounds. If the electrochromic layers 13a to 13c have large specific surface areas, the electrochromic layers 13a to 13c may efficiently carry the electrochromic compounds, thereby exhibiting an excellent contrast ratio in developing or dissipating colors.

A film thickness of the electrochromic layers 13a, 13b and 13c may be preferably in a range of 0.2 to 50 μm. The electrochromic layers 13a, 13b and 13c having the film thickness less than 0.2 μm may not exhibit high color development density. Further, the electrochromic layers 13a, 13b and 13c having the film thickness more than 50 μm may lower color viewability of the electrochromic device 10 due to coloring of the electrochromic layers 13a to 13c as well as increasing manufacturing cost of the electrochromic display device 10.

Materials for the insulator layers 14a and 14b may not be particularly specified but may be formed of any materials insofar as they are a porous film; however, organic or inorganic materials having excellent insulation, durability, and film formability may be used.

The insulator layers 14a and 14b formed of porous films may be formed by any film forming methods known in the art including various methods described below. For example, the insulator layers 14a and 14b may be formed by sintering in which polymeric microparticles or inorganic particles are partially fusion-bonded by mixing a binder or the like to form pores between the particles. Further, the insulator layers 14a and 14b may be formed by extraction in which a structural layer is initially formed of organic or inorganic materials soluble in solvents and a binder insoluble in solvents, and the organic or inorganic materials of the structural layer are then dissolved in the solvents to form pores. Moreover, the insulator layers 14a and 14b may be formed by a foaming method in which a high molecular weight polymer is put in a foam state by heating or degassing. Further, the insulator layers 14a and 14b may be formed by phase transition in which a polymer mixture may be phase-separated by controlling a good solvent and a poor solvent. In addition, the insulator layers 14a and 14b may be formed by irradiation in which the polymer is irradiated to form pores.

Examples of the porous film include a polymer mixture particle film formed of inorganic nanostructure particles (SiO$_2$ particles, Al$_2$O$_3$ particles) and polymer binder, an organic porous film (polyurethane resin, polyethylene resin), or the like.

In addition, an inorganic insulator film may be formed on the porous film. The inorganic insulator film may be formed of materials at least including ZnS. With the materials containing ZnS, the inorganic insulator film may be formed at higher rates by sputtering without damaging the electrochromic layers 13a to 13c. Further, examples of the materials containing ZnS as a major component include ZnO—SiO$_2$, ZnS—SiC, ZnS—Si, and ZnS—Ge. Note that it is preferable that the content of ZnS in the above materials be approximately in a range of 50 to 90 mol % to reasonably maintain crystallinity of the insulator layers 14a and 14b. Accordingly, particularly preferable examples of the materials containing ZnS include ZnS—SiO$_2$ (8/2), ZnS—SiO$_2$ (7/3), ZnS, and ZnS—ZnO—In$_2$O$_3$—Ga$_2$O$_3$ (60/23/10/7).

Since the above materials are used for the insulator layers 14a and 14b, the film thickness of the insulator layers 14a and 14b necessary for maintaining feasible insulation may be decreased. Accordingly, even when the insulator layers 14a and 14b are layered to form a thick film, the insulator layers 14a and 14b may not come off due to the increased thickness of the film.

As already described above, when the ZnS film is formed by sputtering, a porous particle film may be formed in advance as an under coat layer (UCL) to form a porous ZnS film. In this case, the aforementioned nanostructure semiconductor material may be used as the porous particle film. Note that it is preferable that the insulator layers 14a and 14b have a two-layer structure including the porous particle film and a separately formed porous film containing silica and alumina in order to reasonably maintain the insulation of the insulator layers 14a and 14b. Since the insulator layers 14a and 14b are formed of the porous films, the electrolyte layer 16 may penetrate the insulator layers 14a and 14b, and the display electrodes 11a to 11c, which may facilitate migration of ionic charges in the electrolyte layer 16 with the redox reaction. As a result, the electrochromic display device 10 may be implemented as a multicolor display device with excellent color developing or dissipating responsiveness.

The film thickness of the insulator layers 14a and 14b may be preferably in a range of 20 to 2000 nm. If the film thickness of the insulator layers 14a and 14b is less than 20 nm, the insulation of the insulator layers 14a and 14b may not be maintained. If the film thickness of the insulator layers 14a and 14b exceeds 2000 nm, color viewability of the electrochromic device 10 may decrease due to coloring of the electrochromic layers 13a to 13c as well as increasing manufacturing cost of the electrochromic display device 10.

Note that in a case where the inter-electrode resistance between the display electrodes 11a to 11c is increased by increasing the film thicknesses of the electrochromic layers 13a to 13c, the insulator layers 14a and 14b may be excluded.

The protective layers 15a, 15b and 15c are formed of the insulator material and respectively formed between the display electrodes 11a, 11b and 11c and the electrochromic layers 13a, 13b and 13c. That is, the protective layers 15a to 15c are formed on the respective counter electrodes 12a facing side surfaces of the display electrodes 11a to 11c such that the protective layers 15a to 15c are sandwiched between the display electrodes 11a to 11c and the electrochromic layers 13a to 13c, respectively.

In a case where the electrochromic layers 13a to 13c are formed by allowing the electrochromic compounds to be adsorbed to or bond to the nanostructure semiconductor material, the protective layers 15a to 15c may be formed on the surfaces of the display electrodes 11a to 11c or the nanostructure semiconductor materials. Note that it is preferable that the protective layers 15a to 15c be formed on the surfaces of the display electrodes 11a to 11c.

The protective layers 15a to 15c may be formed of organic or inorganic insulator materials. However, it is preferable that the display electrodes 11a to 11c be formed of the inorganic materials having a metallic oxide as a major component in view of exhibiting excellent insulation as the insulator materials. Note that the materials having insulation may include a wide band gap and be less likely to carry an electric current when a direct voltage is applied to those materials. Examples of the organic materials include polymeric materials such as polyethylene, polyvinyl chloride, polyester, epoxy resin, melamine resin, phenolic resin, polyurethane resin, and polyimide resin. Examples of the inorganic materials include materials known to the art such as $SiO_2$, $HfO_2$, $Ta_2O_5$, $Al_2O_3$, $ZrO_2$, $Si_3N_4$, and ZnS, or combinations of these materials. Among these, the materials containing an Al oxide or a Si oxide may be particularly preferable. The materials containing an Al oxide or a Si oxide exhibit excellent insulation, so that it may be easy to independently drive a selected one of the electrochromic layers 13a to 13c to develop or dissipate its corresponding color even if the electrochromic layer is thin.

The film thickness of the protective layers 15a to 15c may preferably be in a range of 0.5 to 500 nm, and also preferably be less than the film thickness of the display electrodes 11a to 11c on which the protective layers 15a to 15c are respectively formed. If the film thickness of the protective layers 15a to 15c is less than 0.5 nm, the insulation of the protective layers 15a to 15c may not be maintained. If the film thickness of the protective layers 15a to 15c exceeds 500 nm, the electrochromic layers 11a to 11c may not develop or dissipate colors due to a decrease in the penetration of electrolytes from the electrolyte layer 16 into the electrochromic layers 13a to 13c as well as a decrease in the migration of the electric charges from the display electrodes 11a to 11c to the electrochromic layers 13a to 13c. Further, if the protective layers 15a to 15c include the film thicknesses greater than those of the display electrodes 11a to 11c, the pores of the porous display electrodes 11a to 11c may be clogged, thereby lowering the penetration of the electrolytes into the electrochromic layers 13a to 13c. If the protective layers 15a to 15c are formed of inorganic materials having a metallic oxide as a major component, the film thickness of the protective layers 15a to 15c may preferably be in a range of 0.5 to 20 nm, and particularly preferably be in a range of 0.5 to 5 nm. If the film thickness of the protective layers 15a to 15c exceeds 5 nm, color development or dissipation driving rates may easily be decreased. Further, it is preferable that the protective layers 15a, 15b and 15c be formed such that the film thicknesses of the protective layers 15a, 15b and 15c vary with the respective display electrodes 11a to 11c based on color development or dissipation properties of the electrochromic layers 13a to 13c and the electrical conductivity of the electrochromic layers 13a to 13c. Note that the protective layers may not be formed on all the display electrodes 11a to 11c.

Note also that if the color development or dissipation properties of the electrochromic layers 13a to 13c are decreased due to contact with (adsorption and bonding to) the protective layers 15a to 15c, it is preferable that surface layers further be formed on the surfaces of the protective layers 15a to 15c. The surface layers may be formed of a transparent conductive material such as ITO that is similar to materials of the display electrodes.

The electrolyte layer 16 may be formed by dissolving supporting electrolytes into solvents so as to increase ionic conductance. Examples of the supporting electrolytes include alkali metal salts, inorganic ion salts such as alkaline earth metal salts, quarternary ammonium salts or acids, and alkaline supporting electrolytes. Specific examples of the supporting electrolytes include $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, $Mg(BF_4)_2$, and tetrabutylammonium perchlorate. Further, examples of the solvents include propylene carbonate, acetonitrile, γ-butyrolactone, ethylene carbonate, sulfolane, dioxolane, tetrahydrofuran, 2-methyl tetrahydrofuran, dimethyl sulfoxide, 1,2-dimethoxyethane, 1,2-ethoxymethoxy ethane, polyethylene glycol, and alcohols. Note that the electrolyte layer 16 may not be limited to the liquid electrolytes formed by dissolving the supporting electrolytes into the solvents. The electrolyte layer 16 may be formed of ionic liquid, gelatinous electrolytes, solid electrolytes such as polymer electrolytes, and the like.

On the other hand, it may be preferable to use gelatinous or solid electrolyte layer 16 in order to improve element strength and reliability, and to prevent color development diffusion. The electrolyte layer 16 may be formed solid by retaining the electrolytes and solvents in the polymeric resin. The electrolyte layer 16 formed by retaining the electrolytes and solvents in the polymeric resin may exhibit high ionic conductance and strength. A preferable example of the polymeric resin includes photo-curable (photo-setting) resin. The electrolyte layer 16 made of the photo-curable resin may be formed at lower temperatures and in a short time compared to that made of thermosetting resin, which may be formed by evaporating the solvents of the materials of the electrolyte layer 16 or by allowing the materials of the electrolyte layer 16 to undergo thermal polymerization in order to reduce the film thickness of the electrolyte layer 16. Examples of the photo-curable resin include, but are not limited to, urethane, ethylene glycol, polypropylene glycol, vinyl alcohol, acrylic, and epoxy.

The electrolyte layer 16 may be provided with a function of the white reflective layer 17 by dispersing white pigment particles 18 into the electrolyte layer 16. Examples of the white pigment particles 18 include, but not limited to, metallic oxides such as a titanium oxide, an aluminum oxide, a zinc oxide, a silicon oxide, oxidation cesium, and oxidation yttrium. If the amount of the white pigment particles 18 contained in the electrolyte layer 16 is large, light applied to the electrolyte layer 16 to cure the photo-curable resin may be blocked by the white pigment particles 18 contained in the electrolyte layer 16. Accordingly, the photo-curable resin may not be efficiently cured. The amount of the white pigment particles 18 contained in the electrolyte layer 16 may vary with the thickness of electrolyte layer 16; however, it is preferable that the amount of the white pigment particles 18 contained in the electrolyte layer 16 be in a range of 10 to 50 wt %.

Further, a film thickness of the electrolyte layer 16 may be preferably in a range of 0.1 to 200 µm, and particularly preferably in a range of 1 to 50 µm. If the film thickness of the electrolyte layer 16 is less than 1 µm, it becomes difficult to maintain the electrolytes in the layer 16. On the other hand, if the film thickness of the electrolyte layer 16 exceeds 50 µm, electric charges may become easy to diffuse into the part in the outside regions of the pixels selected by the electrolyte layer 16.

Materials of the white reflective layer 17 may include an inorganic compound film formed of oxides, nitrides, and sulfides by vacuum deposition, or a film formed of metal oxide particles such as a titanium oxide, an aluminum oxide, a zinc oxide, a silicon oxide, oxidation cesium, oxidation yttrium as well as metal and a metalloid. Further, it is preferable that the white reflective layer 17 formed of the inorganic compound film have a structure similar to those of the insulator layers 14a and 14b in order for the white reflective layer 17 to acquire electrolyte permeability. In addition, the metal oxide particle film may be easily formed by depositing the paste obtained by dispersing metallic oxide particles in a solution. Titanium oxide particles may be particularly preferable as the metallic oxide particles.

Note that a film thickness of the white reflective layer 17 may be preferably in a range of 0.1 to 50 µm, and particularly preferably in a range of 0.5 to 5 µm. The white reflective layer 17 having the film thickness less than 0.5 µm may not sufficiently exhibit the white reflecting effect. Further, the white reflective layer 17 having the film thickness more than 5 µm may not retain electrolyte permeability and film strength simultaneously.

Moreover, if the film thickness of the white reflective layer 17 formed of titanium oxide particles is increased until the white reflectivity reaches the maximum, the film strength may be lowered. Thus, it is preferable that the white reflective layer 17 be formed of a two-layer structure that includes the white reflective layer 17 for securing the film strength and a white electrolyte layer obtained by mixing the white pigment particles 18 with the electrolyte layer 16.

Figure 2:
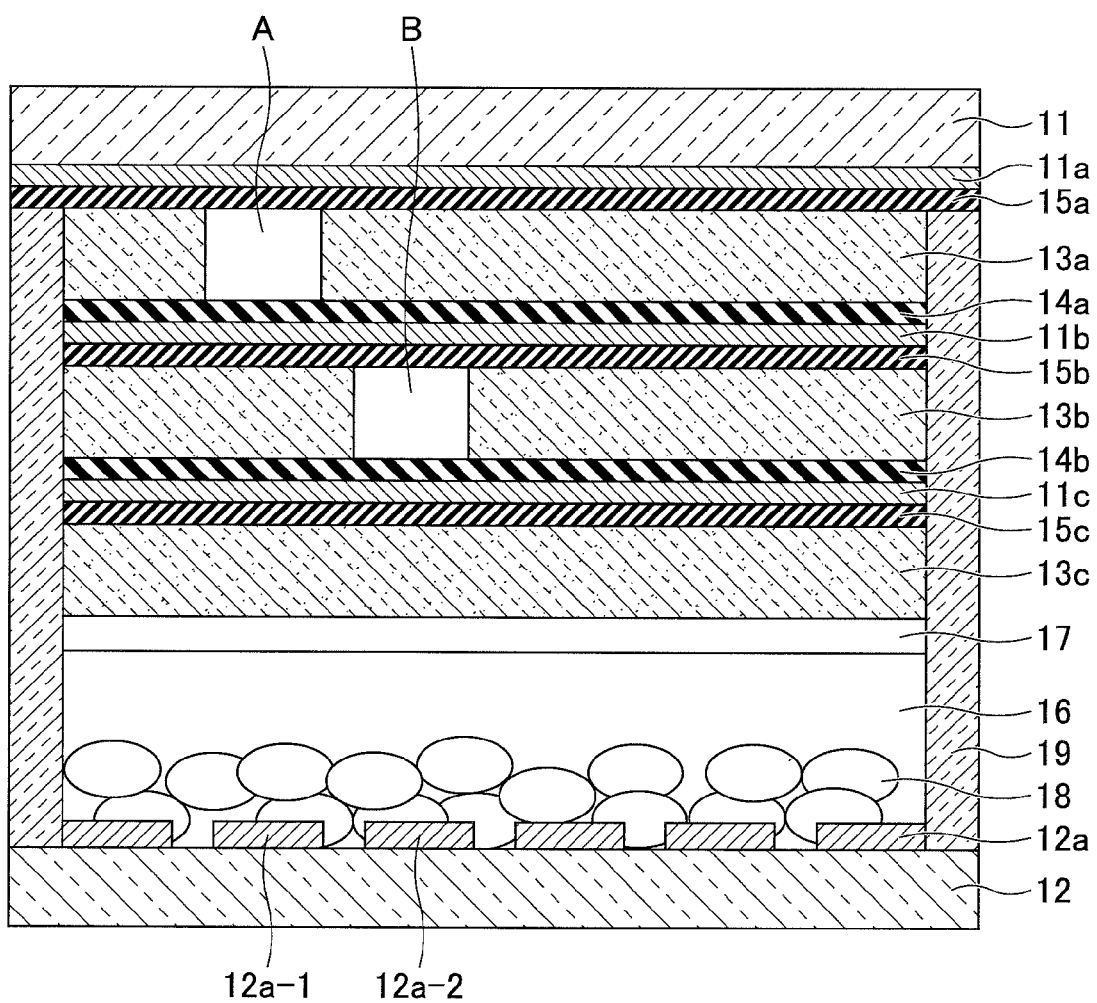
FIG. 2 is a cross-sectional diagram schematically illustrating a state in which the electrochromic display device according to the embodiment is driven to develop color.
Figure 3:
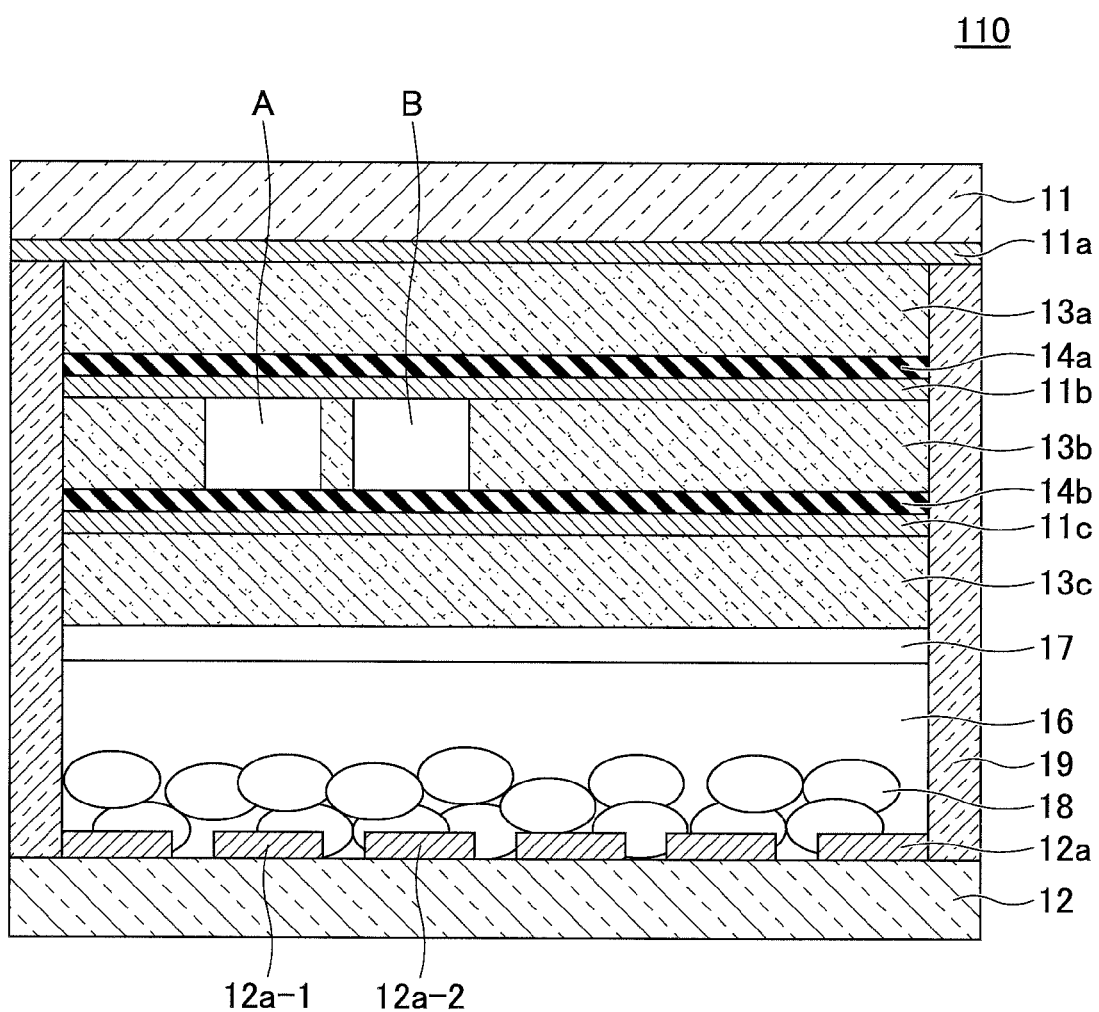
FIG. 3 is a cross-sectional diagram schematically illustrating a state in which a comparative example of the electrochromic display device is driven to develop color.

Next, a method for independently developing color of one of the electrochromic layers 13a to 13c subsequently driven while maintaining the developed color of another one of the electrochromic layers 13a to 13c initially driven is described with reference to FIGS. 2 and 3. FIG. 2 is a cross-sectional diagram schematically illustrating a state in which the electrochromic display device 10 according to the embodiment is driven to develop color. FIG. 3 is a cross-sectional diagram schematically illustrating a state in which a comparative example of an electrochromic display device 110 is driven to develop color. Note that white space regions A and B indicate color development regions in FIGS. 2 and 3.

As illustrated in FIGS. 2 and 3, the counter electrodes 12a include counter pixel electrodes 12a-1 and 12a-2 in each of the electrochromic display devices 10 and 110. Further, the respective counter pixel electrodes 12a-1 and 12a-2 are associated with the white space regions (indicated as A and B), respectively, in each of the electrochromic display devices 10 and 110.

As a driving method for developing color, the following examples may be considered. As illustrated in FIG. 2, in the electrochromic display device 10, a voltage is applied between the counter pixel electrode 12a-1 and the first display electrode 11a to initially drive the A region of the first electrochromic layer 13a to develop color. Thereafter, a voltage is applied between the counter pixel electrode 12a-2 and the second display electrode 11b to subsequently drive the B region of the second electrochromic layer 13b to develop color.

Before further illustrating the electrochromic display device 10 according to the embodiment, the comparative example of the electrochromic display device 110 that includes no protective layers is examined by referring to FIG. 3. In the comparative example of the electrochromic display device 110, when a voltage is applied between the counter pixel electrode 12a-2 and the second display electrode 11b, the A region of the second electrochromic layer 13b develops color while there is failure to maintain the developed color in a not illustrated A region of the first electrochromic layer 13a as illustrated in FIG. 3.

In the above case, when the A region of the first electrochromic layer 13a is driven to develop color, electrolytic ions migrate. Accordingly, the insulation between the first and second display electrodes 11a and 11b is not maintained due to the voltage applied for developing the B region of the second electrochromic layer 13b.

In contrast, in the electrochromic display device 10 according to the embodiment, the protective layer 15a formed of the insulator material is provided between the first display electrode 11a and the first electrochromic layer 13a as illustrated in FIG. 2. With this configuration, the protective layer 15a may prevent the color development charges of the first electrochromic layer 13a from moving back to the first display electrode 11a. Thus, the developed color of the region A of the first electrochromic layer 13a may be maintained even when the insulation (voltage resistance) is unstable. Further, with this configuration, the insulation (voltage resistance) between the first and second display electrodes 11a and 11b is improved. Accordingly, when a voltage is applied between the counter pixel electrode 12a-2 and the second display electrode 11b, a not illustrated A region of the second electrochromic layer 13b may be prevented from developing color as illustrated in FIG. 2. As a result, the B region of the second electrochromic layer 13b may independently develop color while maintaining the developed color of the A region of the first electrochromic layer 13a as illustrated in FIG. 2.

As described above, the electrochromic display device according to the embodiment includes a structure simpler than the electrochromic display device having two or more layers of the electrochromic elements. In the electrochromic display device 10 having such a configuration, desired color may be developed in one of the electrochromic layers 13a to 13c respectively formed on the display electrodes 11a to 11c by applying a voltage between a selected one of the display electrodes 11a to 11c and the counter electrodes 12a.

Further, in the electrochromic display device 10 having such a configuration, the counter pixel electrodes 12a are formed as active matrix driven pixel electrodes. Accordingly, the electrochromic display device 10 may be formed as an active-matrix display device.

(Manufacturing Method for Electrochromic Display Device)

Figure 4:
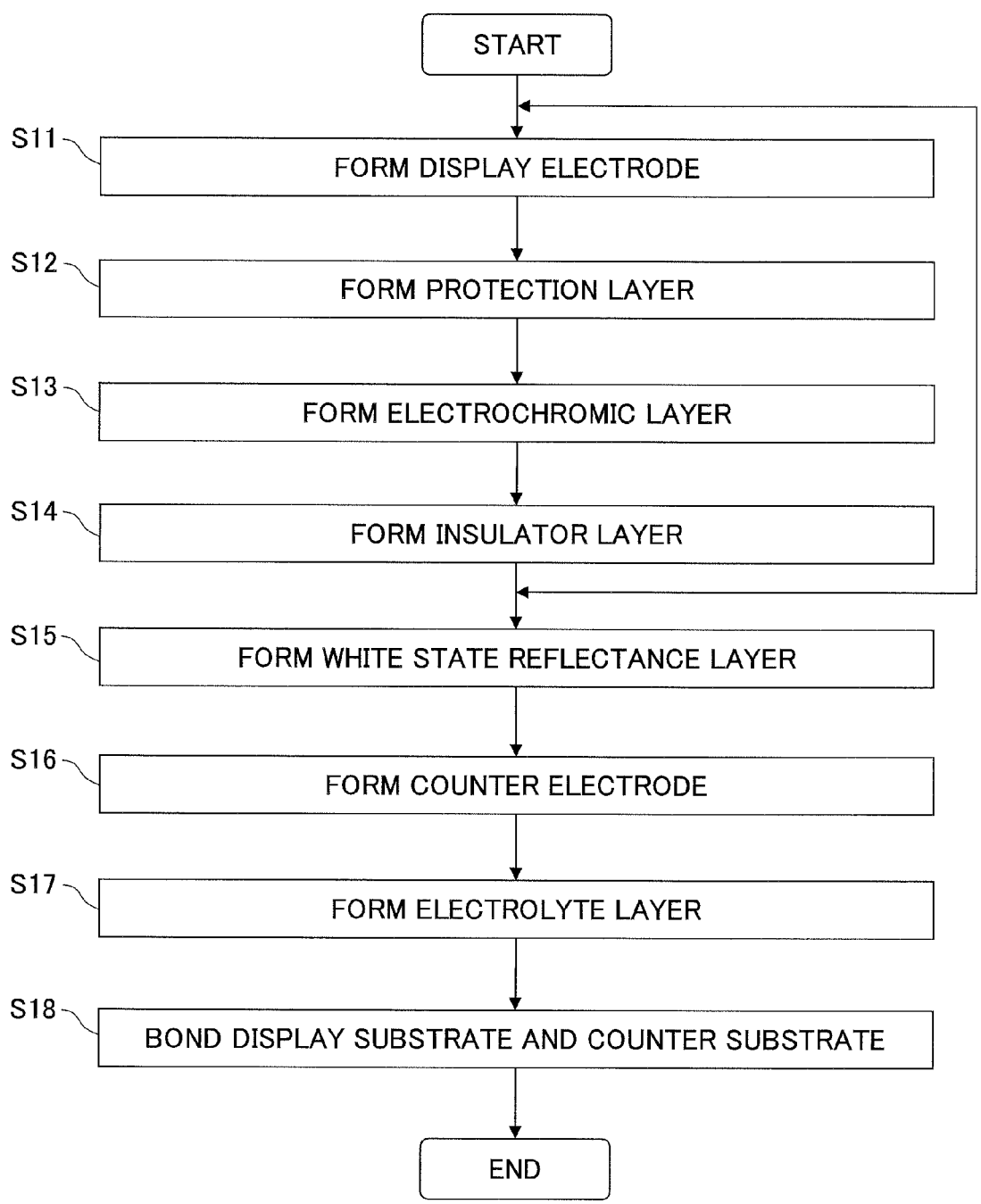
FIG. 4 is a flowchart illustrating steps of a method for manufacturing the electrochromic display device according to the embodiment.

Next, a method for manufacturing the electrochromic display device according to the embodiment is described with reference to FIG. 4. FIG. 4 is a flowchart illustrating steps of the method for manufacturing the electrochromic display device according to the embodiment.

As illustrated in FIG. 4, the method for manufacturing the electrochromic display device according to the embodiment includes forming a display electrode (step S11), forming a protection layer (step S12), forming an electrochromic layer (step S13), forming an insulator layer (step S14), forming a white state reflectance layer (step S15), forming counter electrodes (step S16), forming an electrolyte layer (step S17), and bonding a display substrate and a counter substrate (step S18).

More specifically, in step S11, a display electrode 11a is formed on a display substrate 11 by vacuum deposition such as vapor-deposition, sputtering, and ion-plating.

In step S12, a protective layer 15a is formed on the display substrate 11 on which the display electrode 11a is formed. The protective layer 15a may be easily formed by any process known in the art such as vacuum deposition, coating, inkjet coating, and printing. Among these, it may be particularly preferable to prepare the display electrode 11a formed of the metallic oxide film by vacuum deposition. With the vacuum deposition, it may be possible to increase the productivity in manufacturing the electrochromic display unit 10 by sequentially depositing the display electrode 11a and the protective layer 15a.

In step S13, an electrochromic layer 13a is formed by printing such as spin-coating or screen-printing on the display substrate 11 on which the display electrode 11a and the protective layer 15a are formed.

In step S14, an insulator layer 14a is formed by vacuum deposition such as vapor-deposition, sputtering and ion-plating or by printing such as spin-coating and screen-printing on the display substrate 11 on which the display electrode 11a, the protective layer 15a and the electrochromic layer 13a are formed.

As described above, in steps S11 to S14, a first layer including the display electrode (or first display electrode) 11a, the protective layer (or first protective layer) 15a, the electrochromic layer (or first electrochromic layer) 13a, and the insulator layer (first insulator layer) 14a may be formed on the display substrate 11. Note that in the method for manufacturing the electrochromic display device according to the embodiment, steps S11 to S14 are repeated twice. As a result, the display electrodes 11a to 11c, the protective layers 15a to 15c, the electrochromic layers 13a to 13c and the insulator layers 14a and 14b are formed on the display substrate 11 in a direction from the display substrate 11 side to the counter electrode 12a side such that the display electrodes 11a to 11c and the counter electrodes 12a are mutually arranged at predetermined intervals as illustrated in FIG. 1.

Note that an insulator layer may not be formed in a third layer formed of the display electrode 11c, the protective layer 15c and the electrochromic layer 13c. That is, the insulator layer forming step (step S14) may be omitted from forming of the third layer. The electrochromic display device 10 illustrated in FIG. 1 includes no insulator layer in the third layer that is formed of the display electrode 11c, the protective layer 15c and the electrochromic layer 13c. Note that the first layer includes the first display electrode 11a, the first protective layer 15a, the first electrochromic layer 13a and the first insulator layer 14a; a second layer includes a second display electrode 11b, a second protective layer 15b, a second electrochromic layer 13b and a second insulator layer 14b; and the third layer includes a third display electrode 11c, a third protective layer 15c, and a third electrochromic layer 13.

In step S15, a white reflective layer 17 is formed by printing such as spin-coating or screen-printing on the display substrate 11 on which the display electrode 11a through an electrochromic layer 13c are formed.

In step S16, counter electrodes 12a are formed on a counter substrate 12 by vacuum deposition such as vapor-deposition, sputtering, and ion-plating. Note that if the counter electrodes 12a are formed of organic materials, the counter electrodes 12a may be formed by printing such as spin-coating or screen-printing.

In step S17, an electrolyte layer 16 is formed on the counter substrate 12 on which the counter electrodes 12a are formed. The electrolyte layer 16 is formed by coating dispersion paste containing an electrolyte on the counter substrate 12 on which the counter electrodes 12a are formed.

In step S18, the display substrate 11 on which the display electrode 11a through white reflective layer 17 are formed and the counter substrate 12 on which the counter electrodes 12a and the electrolyte layer 16 are formed are bonded. More specifically, in step S18, the display substrate 11 and the counter substrate 12 may be bonded by applying UV light from the counter substrate 12 side so that a UV curable adhesive contained in the electrolyte layer 16 is cured.

(Driving Method for Electrochromic Display Device)

Figure 5:
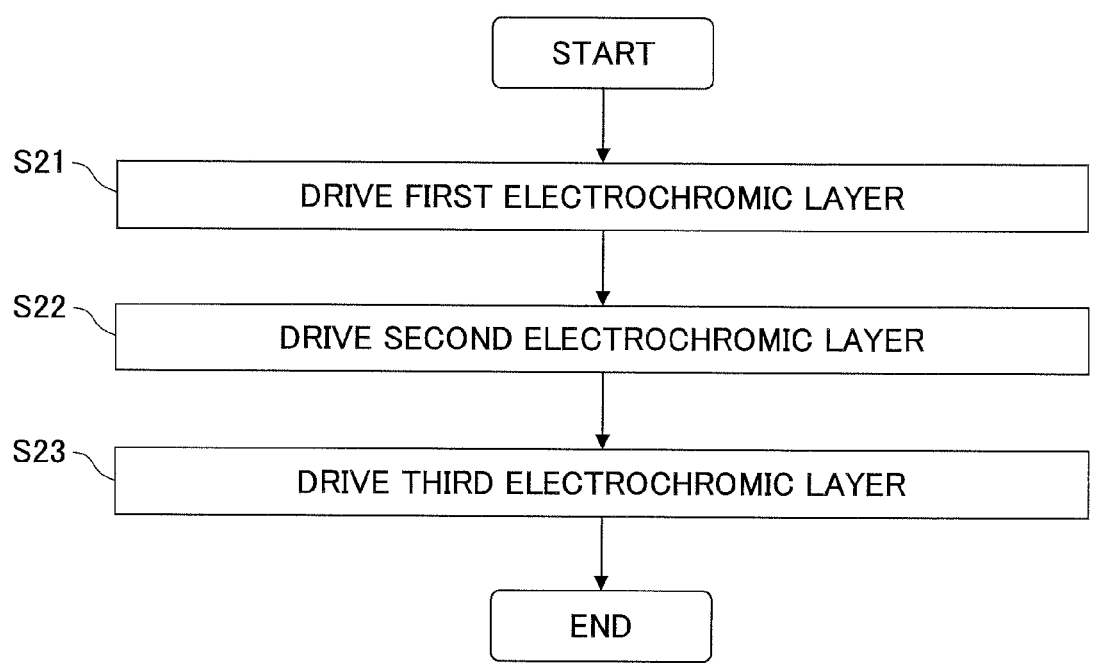
FIG. 5 is a flowchart illustrating steps of a method for driving the electrochromic display device according to the embodiment.

Next, a method for driving the electrochromic display device according to the embodiment is described with reference to FIG. 5. FIG. 5 is a flowchart illustrating steps of the method for driving the electrochromic display device according to the embodiment.

As illustrated in FIG. 5, the method for driving the electrochromic display device according to the embodiment includes driving a first electrochromic layer (step S21), driving a second electrochromic layer (step S22), and driving a third electrochromic layer (step S23).

More specifically, in step S21, a voltage is applied between the first display electrode 11a in the first layer and a counter electrode 12a corresponding to a desired region of the first electronic layer 13a in the first layer. Then, the desired region of the first electronic layer 13a in the first layer is driven to develop or dissipate color.

Subsequently, in step S22, a voltage is applied between the second display electrode 11b in the second layer and a counter electrodes 12a corresponding to a desired region of the second electronic layer 13b in the second layer. Then, the desired region of the second electronic layer 13b in the second layer is driven to develop or dissipate color.

Next, in step S23, a voltage is applied between the third display electrode 11c in the third layer and a counter electrodes 12a corresponding to a desired region of the third electronic layer 13c in the third layer. Then, the desired region of the third electronic layer 13c in the third layer is driven to develop or dissipate color.

The method for driving the electrochromic display device according to the embodiment includes driving of the first to third electrochromic layers 13a to 13c to develop color by subsequently applying voltages between the first to third display electrodes 11a to 11c and the corresponding counter electrodes 12a in the order of distance from farthest to closest between the first to third display electrodes 11a to 11c and the corresponding counter electrodes 12a. That is, the first to third electrochromic layers 13a to 13c formed on the first to third display electrodes 11a to 11c are driven to develop corresponding color in the order where the display electrode (11a, 11b, or 11c) has a longer distance from the corresponding counter electrodes 12a. That is, the first to third electrochromic layers 13a to 13c are driven to develop the corresponding colors in the order of the first electrochromic layer 13a, the second electrochromic layer 13b and the third electrochromic layer 13c. When a voltage is applied between one of the display electrodes 11a to 11c (the second display electrode 11b in this case), the display electrode (the first display electrode 11a in this case) having a distance from the counter electrodes 12a longer than the distance from the counter electrodes 12a that the second electrode 11b has may be less likely to be affected by the applied voltage. Accordingly, the selected electrochromic layer (e.b., electrochromic layer 13b) may be independently driven (from other electrochromic layers) to develop the corresponding color.

Note that in a case where the inter-electrode insulation between the display electrodes 11a to 11c is secured by increasing the film thicknesses of the protective layers 15a to 15c, the driving order of the electrochromic layers 13a to 13c may be changed into any order. For example, voltages may be applied simultaneously between the display electrodes 11a to 11c and the corresponding counter electrodes 12a to drive the first electrochromic layers 13a to 13c to develop corresponding color simultaneously (i.e., steps S21 through S23 are simultaneously carried out). Alternatively, the first to third electrochromic layers 13a to 13c may be driven to develop corresponding colors in the order of distance from closest to farthest between the display electrodes (11a, 11b, or 11c) and the corresponding counter electrodes 12a. That is, the first to third electrochromic layers 13a to 13c are driven to develop the corresponding colors in the order of the third electrochromic layer 13c, the second electrochromic layer 13b and the first electrochromic layer 13a (in the order of steps S23, S22 and S21).

In dissipating color, voltages may be applied between the display electrodes 11a to 11c and the corresponding counter electrodes 12a to drive the first to third electrochromic layers 13a to 13c to dissipate corresponding colors in any order. However it is preferable that the voltages be simultaneously applied between the display electrodes 11a to 11c and the corresponding counter electrodes 12a to drive the first to third electrochromic layers 13a to 13c to dissipate corresponding colors simultaneously. In this manner, driving time for dissipating color may be reduced.

EXAMPLES

Advantages and embodiments are further illustrated by the following examples, but the particular materials and amounts thereof recited in these examples, as well as other conditions and details, should not be construed to unduly limit this invention.

Example 1

Manufacture of Electrochromic Display Device

<Formation of Display Electrode/Protective Layer/Electrochromic Layer/Insulator Layer/White Reflective Layer>

An example 1 of the electrochromic display device 10 illustrated in FIG. 1 was produced as follows. Initially, a 40×40 mm glass substrate having the thickness of 0.7 mm was prepared as the display substrate 11, and an ITO (Indium Tin Oxide) film of approximately 100 nm in thickness was then formed on the glass substrate by sputtering to form the first display electrode 11a in the first layer. Further, an $Al_2O_3$ (aluminium oxide) film of approximately 5 nm in thickness was formed on a surface of the first display electrode 11a in the first layer by sputtering to form the first protective film 15a.

A dispersion liquid of titanium oxide nano-particles (Product name: SP210 produced by Showa Titanium Co., Ltd., mean particle size: approximately 20 nm) was applied onto the display electrode 11a by spin-coating and annealing was conducted at 120° C. for 15 minutes to form a nanostructure semiconductor material formed of a titanium oxide-particle film having approximately 1.5 μm in thickness. Subsequently, a solution 0.8 wt % 2,2,3,3-tetrafluoropropanol (TFP) of a compound 2 represented by the following formula (2) was applied onto the nanostructure semiconductor material (i.e., titanium oxide-particle film) by spin-coating and annealing was conducted at 120° C. for 10 minutes so that electrochromic compound was adsorbed onto a surface of the titanium oxide-particle film to form the first electrochromic layer 13a in the first layer.

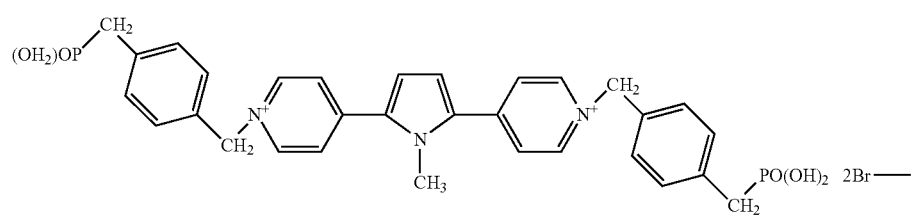

(2)

Next, 5 wt % of $SiO_2$ particles (Product name: NanoTek produced by Kanto Chemical Co., Inc, mean particle size: approximately 30 nm) were dispersed into a solvent prepared by mixing γ-butyl lactone and propylene carbonate in a 1:1 ratio in volume, and urethane resin was further added as a polymer binder into the solvent to prepare coating liquid. The coating liquid was coated by spin coating, and annealing was conducted at 120° C. for 5 minutes to form a $SiO_2$ particle layer. A film of ZnS—$SiO_2$ (at a molar ratio of 8/2) having approximately 30 nm in thickness was formed on the $SiO_2$ particle layer by sputtering to form an insulator layer 14a having electrolyte permeability.

Furthermore, a second display electrode 11b, a second protective layer 15b, a second electrochromic layer 13b and a second insulator layer 14b in the second layer were formed by following a similar method utilized in forming the elements of the first layer, except that the second electrochromic layer 13b was formed by applying a 1.0 wt % 2,2,3,3-tetrafluoropropanol solution (TFP) of a compound 3 represented by the following formula (3) onto the titanium oxide-particle film by spin-coating.

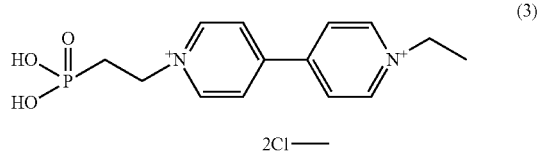

(3)

Furthermore, a third display electrode 11c, a third protective layer 15c, a third electrochromic layer 13c and a third insulator layer 14c in the third layer were formed by following a similar method utilized in forming the elements of the first layer, except that the third electrochromic layer 13c was formed by applying a 0.8 wt % 2,2,3,3-tetrafluoropropanol (TFP) solution of a compound 4 represented by the following formula (4) onto the titanium oxide-particle film by spin-coating.

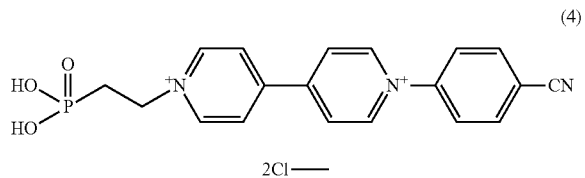

(4)

Subsequently, a 20 wt % dimethoxysulfoxide and polyethylene glycol (Molecular weight 200) solution, urethane paste (Product name: HW140SF produced by DIC Corporation) and tetrabutylammonium perchlorate was mixed as polymer binder and electrolytes in a 2,2,3,3-tetrafluoropropanol (TFP) solution, and 30 wt % of titanium oxide particles (Product name: CR50 produced by Ishihara Sangyo Co. Ltd., Mean particle size: approximately 250 nm) were further dispersed into the obtained mixture to prepare paste. The paste was coated on the third electrochromic layer 13c in the third layer by spin coating, and annealing was conducted at 120° C. for 5 minutes to form a white reflective layer of approximately 1 μm in thickness.
<Formation of Counter Electrode/Electrolyte Layer>

A 32×40 mm glass substrate with a thickness of 0.7 mm was prepared as the counter substrate 12. An ITO film having 6 line portions with a full-width of 35 mm (line width: 4 mm, space width: 1 mm) was formed by sputtering such that the ITO film has a thickness of an approximately 10 nm to form the counter electrodes 12a on the counter substrate 12.

Subsequently, a solution was prepared by mixing tetrabutylammonium perchlorate as a electrolyte, dimethoxysulfoxide and polyethylene glycol (Molecular weight 200) as solvents and UV-curable adhesive (Product name: PTC10 produced by Jujo Chemical Co., Ltd.) at ratios of 1.2:5.4:6:16, and 20 wt % of white titanium oxide particles (Product name: CR50 produced by Ishihara Sangyo Co. Ltd., Mean particle size: approximatepu 250 nm) were dispersed into the obtained mixture to prepare paste. The obtained paste was then applied dropwise to the white reflective layer 17. Next, the display substrate 11 was stacked on the counter substrate 12 and UV light was applied to the stacked display substrate 11 and counter substrate 12 from the counter substrate 12 side to cure the UV curable adhesive so as to bond the display substrate 11 and the counter substrate 12. As a result, the electrochromic display device 10 illustrated in FIG. 1 was produced. Note that 0.2 wt % of bead spacers 19 were mixed into the electrolyte layer such that the thickness of the electrolyte layer 16 was 10 μm.

Figure 6:
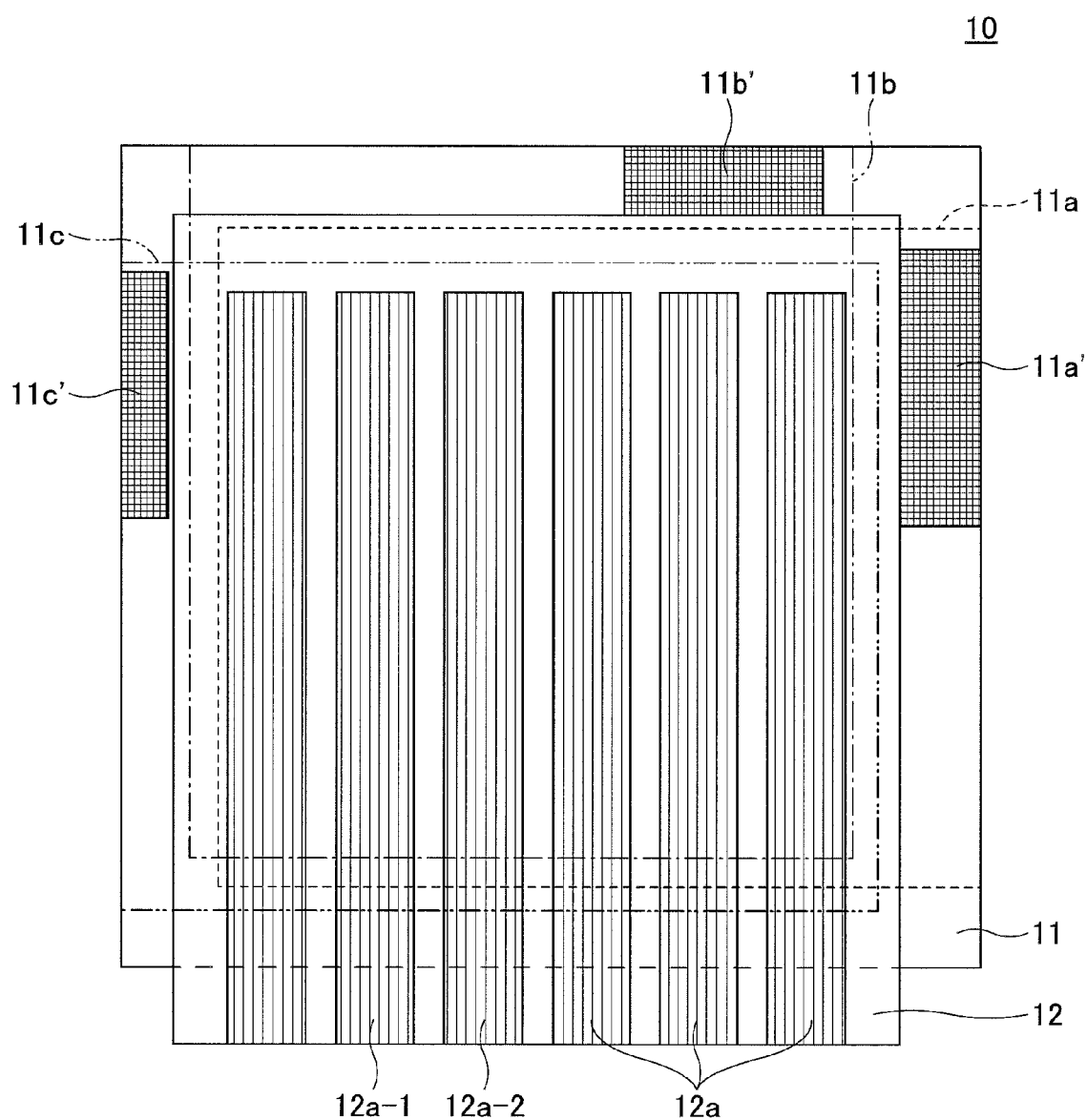
FIG. 6 is a diagram schematically illustrating a configuration of an electrochromic display device utilized in Example 1.

FIG. 6 is a plan diagram illustrating a planer configuration of the electrochromic display device 10. In FIG. 6, the first display electrode 11a, the second display electrode 11b and the third display electrode 11c are indicated by dotted line, a dashed-dotted line and a dashed-two dotted line, respectively.

The first display electrode 11a, the second display electrode 11b and the third display electrode 11c, and the counter electrodes 12a (i.e., counter electrodes 12a-1 and 12a-2) were arranged as illustrated in FIG. 6. Other layers were all formed on an entire surface of the glass substrate except for first, second and third driving connection portions 11a', 11b' and 11c' corresponding to the first, the second and the third display electrodes 11a, 11b and 11c. The sheet resistance of the first, second and third display electrodes 11a, 11b and 11c and the counter electrodes 12a was 150 Ω/cm, and the resistance between the first, second and third display electrodes 11a, 11b and 11c measured by utilizing the first, second and third driving connection portions 11a', 11b' and 11c' was 1 MΩ or above.
[Color Development/Dissipation Test 1]

A negative electrode was connected to the first driving connection portion 11a' corresponding to the first display electrode 11a (in the first layer), and a positive electrode was connected to the counter pixel electrode 12a-1. A voltage of 4.5 V was then applied between the first display electrode 11a and the counter pixel electrode 12a-1 for one second, which had driven the first electrochromic layer 13a (in the first layer) to develop magenta color according to a shape of the counter display electrode 12a-1 (i.e., line portion shape).

Next, the negative electrode and the positive electrode were exchanged such that the positive electrode was connected to the first driving connection portion 11a' corresponding to the first display electrode 11a, and the negative electrode was connected to the counter pixel electrode 12a-1. A voltage of −4.5 V was then applied between the first display electrode 11a and the counter pixel electrode 12a-1 for two seconds, which had driven the first electrochromic layer 13a (in the first layer) to dissipate the developed color (magenta) completely. As a result, the color of the first electrochromic layer 13a had returned to white.

Further, after the application of the voltage of 4.5 V between the first display electrode 11a and the counter pixel electrode 12a-1 for one second, the first display electrode 11a and the counter pixel electrode 12a-1 were allowed to stand for five minutes without applying any voltage. The result indicated that the developed color (magenta) of the first electrochromic layer 13a had been retained, exhibiting excellent image retaining properties.

In addition, the white reflectance in a dissipation state was measured from the display substrate 11 side using a spectrophotometer LCD-5000 (manufactured by Otsuka Electronics). The white reflectance obtained was 50%.
[Color Development/Dissipation Test 2]

A negative electrode was connected to the first driving connection portion 11a' corresponding to the first display electrode 11a (in the first layer), and a positive electrode was connected to the counter pixel electrode 12a-1. A voltage of 4.5 V was then applied between the first display electrode 11a and the counter pixel electrode 12a-1 for one second, which had driven the first electrochromic layer 13a (in the first layer)

to develop magenta color according to a shape of the counter display electrode 12a-1 (i.e., line portion shape).

Next, the negative electrode was connected to the second driving connection portion 11b' corresponding to the second display electrode 11b (in the second layer), and the positive electrode was connected to the counter pixel electrode 12a-2. A voltage of 4.5 V was then applied between the second display electrode 11b and the counter pixel electrode 12a-2 for one second, which had driven the second electrochromic layer 13b (in the second layer) to develop blue color according to a shape of the counter display electrode 12a-2 (i.e., line portion shape). As a result, magenta and blue line portions were displayed.

Example 2

Manufacture of Electrochromic Display Device

An example 2 of the electrochromic display device 10 illustrated in FIG. 1 was produced by following a similar method utilized in Example 1 except that the protective layers 15a to 15c were made of $SiO_2$ with thickness of 10 nm.
[Color Development/Dissipation Test 1]

A negative electrode was connected to the first driving connection portion 11a' corresponding to the first display electrode 11a (in the first layer), and a positive electrode was connected to the counter pixel electrode 12a-1. A voltage of 4.5 V was then applied between the first display electrode 11a and the counter pixel electrode 12a-1 for one second, which had driven the first electrochromic layer 13a (in the first layer) to develop magenta color according to a shape of the counter display electrode 12a-1 (i.e., line portion shape).

Next, the negative electrode and the positive electrode were exchanged such that the positive electrode was connected to the first driving connection portion 11a' corresponding to the first display electrode 11a, and the negative electrode was connected to the counter pixel electrode 12a-1. A voltage of −4.5 V was then applied between the first display electrode 11a and the counter pixel electrode 12a-1 for two seconds, which had driven the first electrochromic layer 13a (in the first layer) to dissipate the developed color (magenta) completely. As a result, the color of the first electrochromic layer 13a had returned to white.

Further, after the application of the voltage of 4.5 V between the first display electrode 11a and the counter pixel electrode 12a-1 for one second, the first display electrode 11a and the counter pixel electrode 12a-1 were allowed to stand for five minutes without applying any voltage. The result indicated that the developed color (magenta) of the first electrochromic layer 13a had been retained, exhibiting excellent image retaining properties.

In addition, the white reflectance in a dissipation state was measured from the display substrate 11 side using a spectrophotometer LCD-5000 (manufactured by Otsuka Electronics). The white reflectance obtained was 51%.
[Color Development/Dissipation Test 2]

A negative electrode was connected to the first driving connection portion 11a' corresponding to the first display electrode 11a (in the first layer), and a positive electrode was connected to the counter pixel electrode 12a-1. A voltage of 4.5 V was then applied between the first display electrode 11a and the counter pixel electrode 12a-1 for one second, which had driven the first electrochromic layer 13a (in the first layer) to develop magenta color according to a shape of the counter display electrode 12a-1 (i.e., line portion shape).

Next, the negative electrode was connected to the second driving connection portion 11b' corresponding to the second display electrode 11b (in the second layer), and the positive electrode was connected to the counter pixel electrode 12a-2. A voltage of 4.5 V was then applied between the second display electrode 11b and the counter pixel electrode 12a-2 for one second, which had driven the second electrochromic layer 13b (in the second layer) to develop blue color according to a shape of the counter display electrode 12a-2 (i.e., line portion shape). As a result, magenta and blue line portions were displayed.

Comparative Example 1

Manufacture of Electrochromic Display Device

A comparative example 1 of the electrochromic display device 110 was produced by following a similar method utilized in Example 1 except that no protective layers were provided in the electrochromic display device 110.
[Color Development/Dissipation Test 1]

A negative electrode was connected to the first driving connection portion 11a' corresponding to the first display electrode 11a (in the first layer), and a positive electrode was connected to the counter pixel electrode 12a-1. A voltage of 4.5 V was then applied between the first display electrode 11a and the counter pixel electrode 12a-1 for one second, which had driven the first electrochromic layer 13a (in the first layer) to develop magenta color according to a shape of the counter display electrode 12a-1 (i.e., line portion shape).

Next, the negative electrode and the positive electrode were exchanged such that the positive electrode was connected to the first driving connection portion 11a' corresponding to the first display electrode 11a, and the negative electrode was connected to the counter pixel electrode 12a-1. A voltage of −4.5 V was then applied between the first display electrode 11a and the counter pixel electrode 12a-1 for two seconds, which had driven the first electrochromic layer 13a (in the first layer) to dissipate the developed color (magenta) completely. As a result, the color of the first electrochromic layer 13a had returned to white.

Further, after the application of the voltage of 4.5 V between the first display electrode 11a and the counter pixel electrode 12a-1 for one second, the first display electrode 11a and the counter pixel electrode 12a-1 were allowed to stand for five minutes without applying any voltage. The result indicated that the developed color (magenta) of the first electrochromic layer 13a had been retained, exhibiting excellent image retaining properties.

In addition, the white reflectance in a dissipation state was measured from the display substrate 11 side using a spectrophotometer LCD-5000 (manufactured by Otsuka Electronics). The white reflectance obtained was 52%.
[Color Development/Dissipation Test 2]

A negative electrode was connected to the first driving connection portion 11a' corresponding to the first display electrode 11a (in the first layer), and a positive electrode was connected to the counter pixel electrode 12a-1. A voltage of 4.5 V was then applied between the first display electrode 11a and the counter pixel electrode 12a-1 for one second, which had driven the first electrochromic layer 13a (in the first layer) to develop magenta color according to a shape of the counter display electrode 12a-1 (i.e., line portion shape).

Next, the negative electrode was connected to the second driving connection portion 11b' corresponding to the second display electrode 11b (in the second layer), and the positive electrode was connected to the counter pixel electrode 12a-2. A voltage of 4.5 V was then applied between the second display electrode 11b and the counter pixel electrode 12a-2 for one second, which had driven the first electrochromic layer 13a (in the first layer) to dissipate the magenta color developed according to the shape of the counter display electrode 12a-1 (i.e., line portion shape), and also had driven the second electrochromic layer 13b (in the second layer) to develop blue color according to the shape of the counter display electrode 12a-1 (i.e., line portion shape) and the counter display electrode 12a-2 (i.e., line portion shape). As a result, two blue line portions were displayed.

Comparative Example 2

Manufacture of Electrochromic Display Device

A comparative example 2 of the electrochromic display device 110 was produced by following a similar method utilized in Example 1 except that the protective layers 15a to 15c were formed of a conductive oxide AZO (ZnO+Al$_2$O$_3$ (2 wt %)) with the thickness of 10 nm.
[Color Development/Dissipation Test 1]

A negative electrode was connected to the first driving connection portion 11a' corresponding to the first display electrode 11a (in the first layer), and a positive electrode was connected to the counter pixel electrode 12a-1. A voltage of 4.5 V was then applied between the first display electrode 11a and the counter pixel electrode 12a-1 for one second, which had driven the first electrochromic layer 13a (in the first layer) to develop magenta color according to a shape of the counter display electrode 12a-1 (i.e., line portion shape).

Next, the negative electrode and the positive electrode were exchanged such that the positive electrode was connected to the first driving connection portion 11a' corresponding to the first display electrode 11a, and the negative electrode was connected to the counter pixel electrode 12a-1. A voltage of −4.5 V was then applied between the first display electrode 11a and the counter pixel electrode 12a-1 for two seconds, which had driven the first electrochromic layer 13a (in the first layer) to dissipate the developed color (magenta) completely. As a result, the color of the first electrochromic layer 13a had returned to white.

Further, after the application of the voltage of 4.5 V between the first display electrode 11a and the counter pixel electrode 12a-1 for one second, the first display electrode 11a and the counter pixel electrode 12a-1 were allowed to stand for five minutes without applying any voltage. The result indicated that the developed color (magenta) of the first electrochromic layer 13a had been retained, exhibiting excellent image retaining properties.

In addition, the white reflectance in a dissipation state was measured from the display substrate 11 side using a spectrophotometer LCD-5000 (manufactured by Otsuka Electronics). The white reflectance obtained was 50%.
[Color Development/Dissipation Test 2]

A negative electrode was connected to the first driving connection portion 11a' corresponding to the first display electrode 11a (in the first layer), and a positive electrode was connected to the counter pixel electrode 12a-1. A voltage of 4.5 V was then applied between the first display electrode 11a and the counter pixel electrode 12a-1 for one second, which had driven the first electrochromic layer 13a (in the first layer) to develop magenta color according to a shape of the counter display electrode 12a-1 (i.e., line portion shape).

Next, the negative electrode was connected to the second driving connection portion 11b' corresponding to the second display electrode 11b (in the second layer), and the positive electrode was connected to the counter pixel electrode 12a-2. A voltage of 4.5 V was then applied between the second display electrode 11b and the counter pixel electrode 12a-2 for one second, which had driven the first electrochromic layer 13a (in the first layer) to dissipate the magenta color developed according to the shape of the counter display electrode 12a-1 (i.e., line portion shape), and also had driven the second electrochromic layer 13b (in the second layer) to develop blue color according to the shape of the counter display electrode 12a-1 (i.e., line portion shape) and the counter display electrode 12a-2 (i.e., line portion shape). As a result, two blue line portions were displayed.

Examples 3 and 4

Manufacture of Electrochromic Display Device

Examples 3 and 4 of the electrochromic display device 10 illustrated in FIG. 1 were produced by following a similar method utilized in Example 1 except that the protective layers 15a to 15c were made of SiO$_2$ with respective thicknesses of 0.5 nm (Example 3) and 1 nm (Example 4). The color development/dissipation test 2 was conducted on the examples 3 and 4 of the electrochromic display device 10 in a similar manner as that conducted in Example 1. Note that in the example 3, an additional color development/dissipation test 2 was conducted on the electrochromic display device 10 by reversing the driving order of the display electrodes (i.e., display electrodes 11a and 11b) to develop or dissipate color. The results obtained in Examples 1 and 2, and Comparative Example 1are summarized in TABLE 1.

TABLE 1

| DISPLAY DEVICE | PROTECTIVE FILM THICKNESS (nm) | DRIVING ORDER (DISPLAY ELECTRODE: DE) | DISPLAY RESULT |
| --- | --- | --- | --- |
| EXAMPLE 1 | 5 | DE 11a → DE 11b | DISPLAYED (MAGENTA, BLUE) |
| EXAMPLE 2 | 10 | DE 11a → DE 11b | DISPLAYED (MAGENTA, BLUE) |
| EXAMPLE 3 | 0.5 | DE 11a → DE 11b | DISPLAYED (MAGENTA, BLUE) |
| EXAMPLE 4 | 1 | DE 11a → DE 11b | DISPLAYED (MAGENTA, BLUE) |
| EXAMPLE 3 | 0.5 | DE 11b → DE 11a | NOT DISPLAYED (BLUE, BLUE) |
| COMPARATIVE EXAMPLE 1 | 0 | DE 11a → DE 11b | NOT DISPLAYED (BLUE, BLUE) |

In Examples 3 and 4, a negative electrode was connected to the first driving connection portion 11a' corresponding to the first display electrode 11a (in the first layer), and a positive electrode was connected to the counter pixel electrode 12a-1. A voltage of 4.5 V was then applied between the first display electrode 11a and the counter pixel electrode 12a-1 for one second, which had driven the first electrochromic layer 13a (in the first layer) to develop magenta color according to a shape of the counter display electrode 12a-1 (i.e., line portion shape) in both Examples 3 and 4.

Subsequently, in Examples 3 and 4, the negative electrode was connected to the second driving connection portion 11b' corresponding to the second display electrode 11b (in the second layer), and the positive electrode was connected to the counter pixel electrode 12a-2. A voltage of 4.5 V was then applied between the second display electrode 11b and the counter pixel electrode 12a-2 for one second, which had driven the second electrochromic layer 13b (in the second layer) to develop blue color according to a shape of the counter display electrode 12a-2 (i.e., line portion shape) in both Examples 3 and 4. As a result, magenta and blue line portions were displayed.

Note that in Example 3, the driving order of the display electrodes was changed (reversed) from the "display electrode 11a→display electrode 11b" order to the "display electrode 11b→display electrode 11a" order. In this case, the negative electrode was initially connected to the second driving connection portion 11b' corresponding to the second display electrode 11b (in the second layer), the positive electrode was connected to the counter pixel electrode 12a-2, and a voltage of 4.5 V was then applied between the second display electrode 11b and the counter pixel electrode 12a-2 for one second. The result indicated that the second electrochromic layer 13b (in the second layer) was driven to develop blue color according to a shape of the counter display electrode 12a-2 (i.e., line portion shape). However, when a negative electrode was connected to the first driving connection portion 11a' corresponding to the first display electrode 11a (in the first layer), a positive electrode was connected to the counter pixel electrode 12a-1, and a voltage of 4.5 V was then applied between the first display electrode 11a and the counter pixel electrode 12a-1 for one second in Example 3, the result indicated that the first electrochromic layer 13a (in the first layer) did not develop magenta color according to the shape of the counter display electrode 12a-1 (i.e., line portion shape), but the second electrochromic layer 13b (in the second layer) had developed blue color according to a shape of the counter display electrode 12a-2 (i.e., line portion shape). As a result, two blue line portions were displayed.

According to the above embodiments, there is provided an electrochromic display device having a structure simpler than the electrochromic display device having plural layers of the electrochromic elements, and capable of independently developing or dissipating desired colors.

So far, the preferred embodiments are described. However, the invention is not limited to those specifically described embodiments, and various modifications and alteration may be made within the scope of the inventions described in the claims.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese priority application No. 2010-174192 filed on Aug. 3, 2010, and Japanese priority application No. 2011-137121 filed on Jun. 21, 2011, with the Japanese Patent Office, the entire contents of which are hereby incorporated by reference.

What is claimed is:

1. An electrochromic display device comprising:
a display substrate;
a counter substrate facing the display substrate;
an array of counter electrodes formed on the counter substrate;
at least a first display electrode and a second display electrode arranged between the display substrate and the array of the counter electrodes, the first display electrode and the second display electrode having a predetermined distance from each other;
a first electrochromic layer arranged on the first display electrode and a second electrochromic layer arranged on the second display electrode;
an electrolyte layer arranged between the first and the second display electrodes and the array of the counter electrodes; and
a protective layer made of an insulator material formed on a counter electrode facing side surface of one of the first and the second display electrodes such that the protective layer is sandwiched between the selected one of the first and the second display electrodes and a corresponding one of the first and the second electrochromic layers.

2. The electrochromic display device as claimed in claim 1, wherein the insulator material includes a metallic oxide as a major component.

3. The electrochromic display device as claimed in claim 1, wherein the protective layer includes a thickness less than a thickness of the selected one of the first and the second display electrodes on the counter electrode facing side surface of which the protective layer is formed.

4. The electrochromic display device as claimed in claim 3, wherein the thickness of the protective layer formed on the counter electrode facing side surface of the selected one of the first and the second display electrodes is in a range of 0.5 to 5 nm.

5. The electrochromic display device as claimed in claim 3, wherein in a case where the protective layer is formed on the counter electrode facing side surfaces of both the first and the second display electrodes as a first protective layer formed on the first display electrode and a second protective layer formed on the second display electrode, the first protective layer and the second protective layer include mutually different thicknesses.

6. The electrochromic display device as claimed in claim 1, wherein the insulator material includes one of an Al oxide and a Si oxide.

7. The electrochromic display device as claimed in claim 1, wherein the protective layer is formed by vacuum deposition.

8. The electrochromic display device as claimed in claim 1, wherein voltages are applied between the first and the second display electrodes and the corresponding counter electrodes in the order of distance from farthest to closest between the first and the second display electrodes and the corresponding counter electrodes to subsequently drive the first and the second electrochromic layers to develop corresponding colors.

* * * * *